United States Patent [19]

Swidwa

[11] Patent Number: 5,728,992

[45] Date of Patent: Mar. 17, 1998

[54] APPARATUS AND METHOD FOR REAL TIME EVALUATION OF LASER WELDS ESPECIALLY IN CONFINED SPACES SUCH AS WITHIN HEAT EXCHANGER TUBING

[75] Inventor: Kenneth J. Swidwa, N. Huntingdon, Pa.

[73] Assignee: Westinghouse Electric Corporation, Pittsburgh, Pa.

[21] Appl. No.: 609,082

[22] Filed: Feb. 29, 1996

[51] Int. Cl.$^6$ .................................................. B23K 26/02
[52] U.S. Cl. ............................ 219/121.64; 219/121.83
[58] Field of Search ......................... 219/121.63, 212.64, 219/121.83; 976/DIG. 214, DIG. 212; 250/341.6, 330; 374/5, 120, 121, 139; 356/43

[56] References Cited

U.S. PATENT DOCUMENTS

| | | |
|---|---|---|
| 4,121,087 | 10/1978 | Malmuth et al. . |
| 4,574,180 | 3/1986 | Kansner et al. . |
| 4,657,169 | 4/1987 | Dostoomian et al. ............... 228/103 |
| 4,663,513 | 5/1987 | Webber . |
| 4,675,146 | 6/1987 | Sutton, Jr. . |
| 4,695,697 | 9/1987 | Kosa ................................ 219/121.83 |
| 4,817,020 | 3/1989 | Chande et al. . |
| 4,831,233 | 5/1989 | Gordon . |
| 5,045,669 | 9/1991 | Ortiz, Jr. et al. .................. 219/121.83 |
| 5,071,417 | 12/1991 | Sinofsky . |
| 5,145,637 | 9/1992 | Richardson et al. . |
| 5,155,329 | 10/1992 | Terada et al. . |
| 5,182,429 | 1/1993 | Piri et al. . |
| 5,256,852 | 10/1993 | Boudot ............................ 219/121.83 |
| 5,283,416 | 2/1994 | Shirk . |
| 5,334,191 | 8/1994 | Poppas et al. ..................... 606/12 |
| 5,359,172 | 10/1994 | Kozak et al. . |
| 5,371,767 | 12/1994 | Piri . |

FOREIGN PATENT DOCUMENTS

| | | | |
|---|---|---|---|
| 3710816 | 10/1988 | Germany | ............... 219/121.63 |
| 4027714 | 3/1992 | Germany | ............... 219/121.63 |
| 4140182 | 6/1993 | Germany . | |
| 62-183980 | 8/1987 | Japan | ............... 219/121.8 |

OTHER PUBLICATIONS

Ishida et al., "Monitoring for Pulsed YAG Laser Welding–Development of Monitoring Equipment", Proceedings of the 5th International Conference on Production Engineering, Jul. 1984, pp. 466–471.

Ishida et al., "Study of Pulsed YAG Laser Welding—Observation of Laser Processes and Monitoring of Laser Welding with Reflected Laser Light", J. of the Japan Society of Precision Engineering, Dec. 1984, vol. 50, No. 12, pp. 1944–1949.

Alavi et al., "Optical Emisssion During Laser Welding", Laser and Optoelektronik, Jun. 1989, vol. 21(3) pp. 69–72.

*Primary Examiner*—Teresa J. Walberg
*Assistant Examiner*—Gregory L. Mills

[57] ABSTRACT

Welds made by pulses of laser energy are evaluated on-line by analyzing light emitted from the weld site during application the laser pulses. The pulses of light from the weld site are compared with base pulses generated from a good weld, and are used to calculate parameters such as heat-up rate and peak temperature which in turn, are analyzed to determine weld quality. For use in welding in confined spaces such as heat exchange tubes, and particularly the tubes in a PWR steam generator, a single optic fiber delivers the laser energy pulses to the weld site and transmits light from the weld site back to a splitter which diverts it to detectors for conversion to electrical signals used to generate a graphical display.

15 Claims, 6 Drawing Sheets

APPARATUS AND METHOD FOR REAL TIME EVALUATION OF LASER WELDS ESPECIALLY IN CONFINED SPACES SUCH AS WITHIN HEAT EXCHANGER TUBING

BACKGROUND OF THE INVENTION

1. Field of the Invention

This invention relates to apparatus and a method for evaluating laser welds as they are being made, and is particularly suitable for evaluating laser welds made in confined spaces such as within heat exchanger tubing an example of which is the tubing of a PWR steam generator.

2. Background Information

Systems for laser welding are well known. They are particularly suitable for welding in confined spaces, such as inside the tubes of heat exchangers. One such application is welding inside the heat exchanger tubes of a pressurized water reactor (PWR) nuclear power plant. Laser welding is used to directly repair cracks in the tubing or to secure sleeves which bridge damaged sections of the tubes.

The steam generator tubes of a PWR have small inner diameters, typically ¾ to ⅞ inches (1.9 to 2.2 cm) which are reduced even further if repair sleeves are installed. Access to the tubes through a bifurcated hemispherical chamber at the bottom of the steam generator is restricted. As the steam generator becomes radioactive in use, the welding is performed remotely through the use of robotic manipulators. Specialized laser welding apparatus has been developed for this application. The laser beam is delivered through an optic fiber extending axially through a tool which is inserted into the steam generator tubing. A lens and mirror system is provided in a weld head to focus the beam and deflect it radially outward to the inner surface of the tubing. A mechanism is provided to rotate the mirror for full 360° coverage. Examples of such apparatus for welding inside the tubes of steam generators can be found in U.S. Pat. Nos. 5,182,429; 5,359,172 and 5,371,767.

It is known to monitor radiation generated by the laser welding process, typically downstream of the weld site, to assess the quality of the weld. This is not difficult for an open weld site. U.S. Pat. No. 5,155,329 discloses an arrangement in which a number of monitoring optic fibers arranged around a central optic-fiber, which delivers pulsed laser energy to the weld site, transmit light from the weld site to an analyzer. The analyzer determines the intensity of the beam and the depth of the weld from the minimum intensity, between pulses of the laser beam, of light of a specific wavelength emitted by the weld pool.

The limited space available within the steam generator tubes does not accommodate an arrangement such as that disclosed in U.S. Pat. No. 5,155,329. The current apparatus for laser welding steam generator tubes does have splitters in junction boxes joining sections of the laser beam delivery fiber which divert a small portion of the laser beam to detectors for monitoring the intensity of the delivered beam and the integrity and condition of the delivery system. However, these are all located outside of the tube and there is no arrangement for real time monitoring of reflected or emitted light from the weld site. Instead, after many tubes have been welded, the weld tool is replaced by an inspection tool which is serially inserted into each welded tube. This is not only time consuming, but can allow many bad welds to be made before a problem is detected.

There is a need therefore for an improved method and apparatus for laser beam welding in confined spaces such as the tubes of heat exchangers and particularly the steam generator tubes in PWRs which provides real time monitoring of the weld at the weld site.

There is a more particular need for such an improved method and apparatus which does not require the use of multiple monitoring optic-fibers in addition to the optic-fiber delivering the laser beam.

There is also a need for such a method and apparatus which can monitor the condition of the weld head and permit change-out of a faulty weld head before unacceptable welds are made.

SUMMARY OF THE INVENTION

These needs and others are satisfied by the invention which is directed to a method and apparatus for laser beam welding providing real time monitoring of the weld at the weld site, especially in confined spaces such as the tubes of heat exchangers, and particularly the steam generator tubes in PWRs. In accordance with one aspect of the invention, light from the weld site to which pulses of laser energy are supplied is analyzed during the delivery of the pulses. This analysis comprises comparing the wave shape of the light from the weld site during delivery of the pulses of laser energy to base wave shapes produced under known conditions. This analysis includes determining the heat-up rate of the weld site during each pulse of laser energy. More particularly, this heat-up rate is determined from the time interval after initiation of delivery of the pulse of laser energy to the weld site that light from the weld site exhibits a second substantial upward shift in amplitude. When the pulse is first applied to the weld site, the temperature of the metal begins to rise thereby causing an increase in the amplitude of emitted light. The amplitude of this light from the weld site then levels off as the laser energy is absorbed in the latent heat of the metal. The second substantial increase in the amplitude of light from the weld site occurs as the metal liquifies and its temperature rises. The time interval between the application of the laser pulse and the second substantial increase in amplitude of the light from the weld site is used as a measure of the heat-up rate of the weld site. One of the measures of the quality of the weld is a comparison of the heat-up rate to a standard heat-up rate for the particular material and laser energy.

Another measure of weld quality is the peak temperature of the weld site which is determined from the area under pulses of light emitted from the weld site. The amount of laser energy reaching the weld site can be determined by comparing the waveform of the pulses of light from the weld site to base waveforms developed for the welding conditions. A progressive reduction in the amplitude of the pulses of light from the weld site compared to the base waveforms is an indication of deterioration of the weld head. This can result, from example, from splattering of metal onto the components of the laser beam delivery system such as the mirror that deflects the axially delivered laser beam radially outward to the weld site.

Analysis of the light from the weld site can also be used to detect other weld defects such as blow holes. Blow holes are caused by contamination, usually water at the weld site which is converted to stem. Blowing off of the steam causes splattering of the metal leading to a rough weld surface. It also results in lower temperatures being reached as the energy escapes the weld site. Blow holes and other such contaminate defects can be detected by low, erratic amplitude of the pulses of light from the weld site. In addition to analyzing the individual pulses of light from weld site, displays are generated which present the amplitude of the pulses from the weld site around the entire weld. Blow holes and other contaminates show up as spikes in these composite presentations.

When deterioration of the weld head is detected, the weld head can be changed out before the point is reached that unacceptable welds are being made. As this decision can be made on-line, it provides a great improvement over the prior art where analysis of weld quality can not be made until after removal of the weld head; and hence, many bad welds may be made before the deterioration of the weld head is detected.

As another aspect of the invention, a single optic fiber delivers the beam of laser energy to the weld site and transmits light from the weld site in the opposite direction. A diverter means in the single optic fiber comprises a splitter diverting reflected light and the light emitted from the weld site to an analyzer which provides the above indications of weld quality. This splitter also diverts a portion of the laser beam to an energy monitor. This indication of laser pulse energy is used to differentiate a reduction in the amplitude of light from the weld site due to deterioration of the weld head from a reduction of laser energy delivered to the weld site. The single optic fiber delivering both the pulses of laser energy to the weld site and transmitting the pulses of light from the weld site back to the splitter, makes the invention particularly useful for welding in very confined spaces, such as inside heat exchanger tubes, and particularly the heat exchanger tubes of PWR steam generators. The small profile of the weld head made possible by use of this single optic fiber is even more important in those applications where a sleeve is welded inside the PWR steam generator tubes leaving even less space for the weld head. A weld head inserted within the heat exchanger tubes directs the pulses of laser energy radially outward. By analyzing light from the weld site at different angular positions, the concentricity of the weld head within the tube can be determined.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As discussed, the invention is directed to a method and apparatus for real time monitoring of laser welding in confined spaces. It will be described as applied to laser welding of heat exchanger tubes and in particular the heat exchanger tubes in the steam generator of a pressurized water reactor (PWR) nuclear power plant. It will be understood that the invention has application to monitoring of laser welding in other applications, and in some aspects is not limited to monitoring laser welding in confined spaces.

Figure 1:
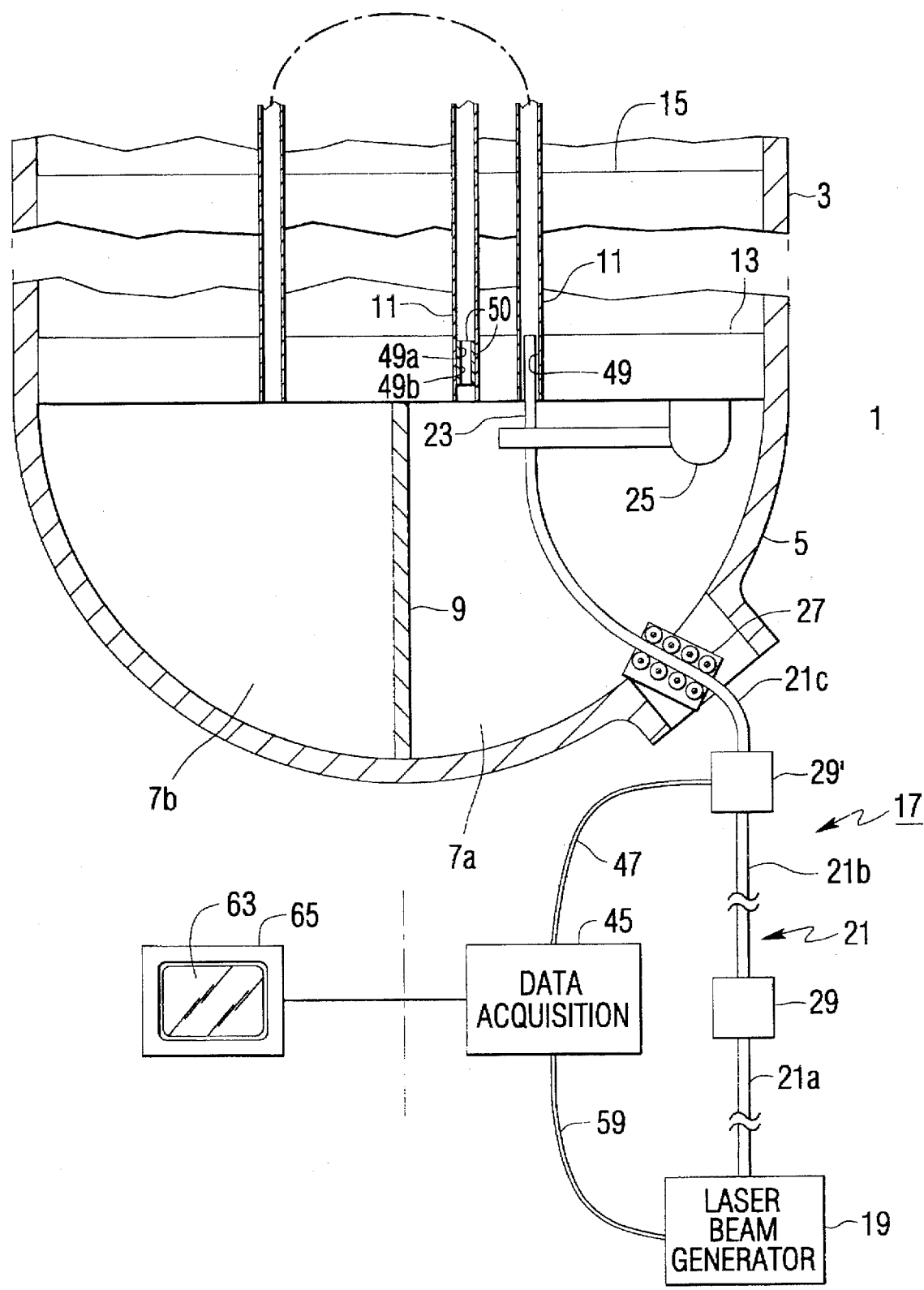
FIG. 1 is a schematic view illustrating application of the invention to welding inside the heat exchanger tubes of a PWR steam generator.

As shown in FIG. 1, the PWR steam generator 1 comprises an upright cylindrical vessel 3 with a hemispherical lower end 5 forming a hemispherical chamber divided into an inlet section 7a and an outlet section 7b by a vertical partition 9. A large number of U-shaped tubes 11 secured at each end in a horizontal tube sheet 13 provide flow paths between the inlet chamber 7a and the outlet chamber 7b. The U-shaped tubes 11 are also supported at various levels above the tube sheet 13 by grids 15. The tubes 11 are typically secured in the tube sheet 13 by expansion.

As is well known, heated coolant from the reactor (not shown) is introduced into the inlet chamber 7a, flows through the U-shaped tubes 11 to the outlet chamber 7b from which it is recirculated through the reactor. Feed water, which is introduced into the upright cylindrical vessel 3 above the tube sheet 13, is converted into steam by the heated coolant circulated through the tubes 11. The steam is then used to drive a turbine generator (not shown).

It is known that after prolonged operation of the steam generator 1, the tubes 11 can become cracked. Typically this occurs at the tube sheet 11 or the grids 15. It is known to repair such cracks in the tubes 11 by welding. Two techniques are used for repairing crack in generator tubes 11 by welding. In one technique, the region of the tube in which the crack is located is welded directly. In the second technique, a sleeve is inserted into the tube 11 and welded above and below the crack. With both techniques, the space in which the weld must be performed is confined, and especially in the case of welding the sleeve to bridge the damaged section of the tube. Laser welding has been found to be uniquely suited to welding in such confined spaces. The present invention utilizes such a laser welding system 17.

The laser welding system 17 includes a laser beam generator 19 located remotely from the tubes 11 in the steam generator. An optic fiber cable 21 delivers the laser beam from the laser beam generator 19 to a tool or weld head 23 which is inserted into the steam generator tube 11 either from the inlet chamber 7a, as shown, or the outlet chamber 7b. The tool 23 may be one of the known types such as disclosed in U.S. Pat. Nos. 5,182,429; 5,359,172 and 5,371, 767. A tool handling device 25 is used to insert the tool 23 into and withdraw it from a selected tube 11. In the preferred embodiment of the invention, this tool handling device 25 is a ROSA robotic arm developed and manufactured by Westinghouse Electric Corporation located in Pittsburgh, Pa., and can be such as that described in U.S. Pat. No. 4,538,956. A pusher puller assembly 27 is used to extend and retract the optic fiber cable 21 as the tool 23 is inserted in and withdrawn from the selected heat exchanger tube 11.

Figure 2:
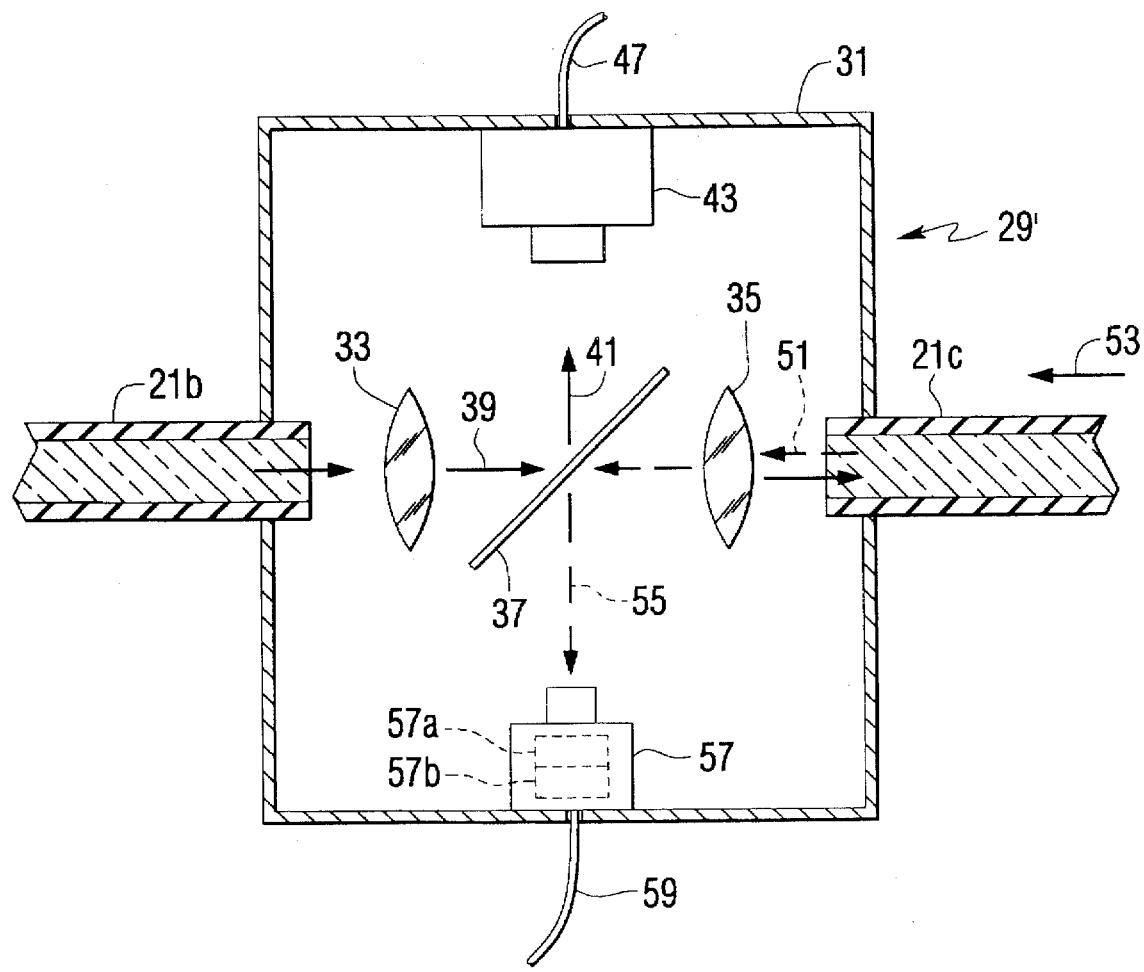
FIG. 2 is a schematic view of a diverter in accordance with the invention that includes an energy monitor and a sensor for light emitted from the weld site.

The optic fiber cable 21 is made up of a plurality of cable sections 21a, 21b and 21c serially connected by connector units 29. These connector units 29 include lenses which collimate and refocus the light pulses for transmission from one section of the optic fiber cable 21 to the next. The connector 29' which transmits the pulses to the last section 21c of the fiber optic cable which is connected to the weld head or tool 23 is shown schematically in FIG. 2. As shown there, the connector 29' includes within a housing 31 a collimator lens 33 which collimates light in the pulses of laser energy delivered by the optic fiber cable section 21b, and a focusing lens 35 which refocuses the pulses of laser energy in the succeeding section 21c of the optic fiber cable. Between the two lenses 33 and 35 is a splitter 37 set at a 45° angle to the path 39 followed by the pulses. As is well known, the splitter 37 passes most of the light in the laser pulses through to the focusing lens 35. However, a small portion of the light in each pulse is deflected transversely along the path 41 to a power monitoring detector 43 which converts the deflected light into an electrical signal which is delivered to a data acquisition unit 45 (see FIG. 1) over a lead 47.

The pulses delivered to the optic fiber cable Section 21c are delivered to the weld site 49 within the tube 11 by the tool or weld head 23. The tubes 11 can be welded directly, or a repair sleeve 50 can be placed in the tube bridging any crack or other defect and welds 49a and 49b can be made above and below the defect. These pulses heat up the weld site which begins to radiate. The radiated light passes backward through the weld head 23 and the cable section 21c along with a small portion of the laser pulses delivered through the section 21c which is reflected by a mirror in the weld head 23. This light 51 passing in a second direction 53 through the optic fiber section 21c has a portion diverted by the splitter 37 transversely as indicated at 55 to the detector 57. This detector 57 is a well known two wavelength detector having a silicon detector 57a which is sensitive to light of one of the wavelengths and which passes light of the other wavelength through to a second lead sulfide detector 57b. The signals generated by these two detectors and representative of the amplitude of the diverted light 55 at the two wavelengths are transmitted to the analyzer 45 through a cable 59. The tool or weld head 23 directs the pulses of laser energy radially outward toward the wall of the tube 11. By comparing light from the weld site at different angular positions of the weld head 23, the concentricity of the weld head within the tube 11 can be determined.

Returning to FIG. 1, the data acquisition unit 45 stores the pulse information received from the energy monitor and from the analyzer monitor and processes it for presentation on a display device 63 such as on the monitor 65.

In performing welding in accordance with the invention, pulses of laser energy are delivered to the weld head 23 through the optic fiber 21. The weld head 23 contains a mirror which directs the pulses of laser energy radially outward to the inner surface of the steam generator tube 11 or the repair sleeve 50. The weld head 23 is rotated 360° inside the tube or sleeve to effect the weld. A first pass is made at low power to preheat the metal. This is followed by a second weld at a higher energy level which completes the weld. The analysis provided by the data acquisition unit 45 is presented on the display 63. Several types of displays are generated. For each pulse, a display is generated of the energy delivered to the weld site and the response of each of the detectors 57a and 57b. Other displays illustrate the average values of these signals over the full 360° of the weld. Additional displays, illustrate calculated values for each of the pulses of the display.

Figure 4:
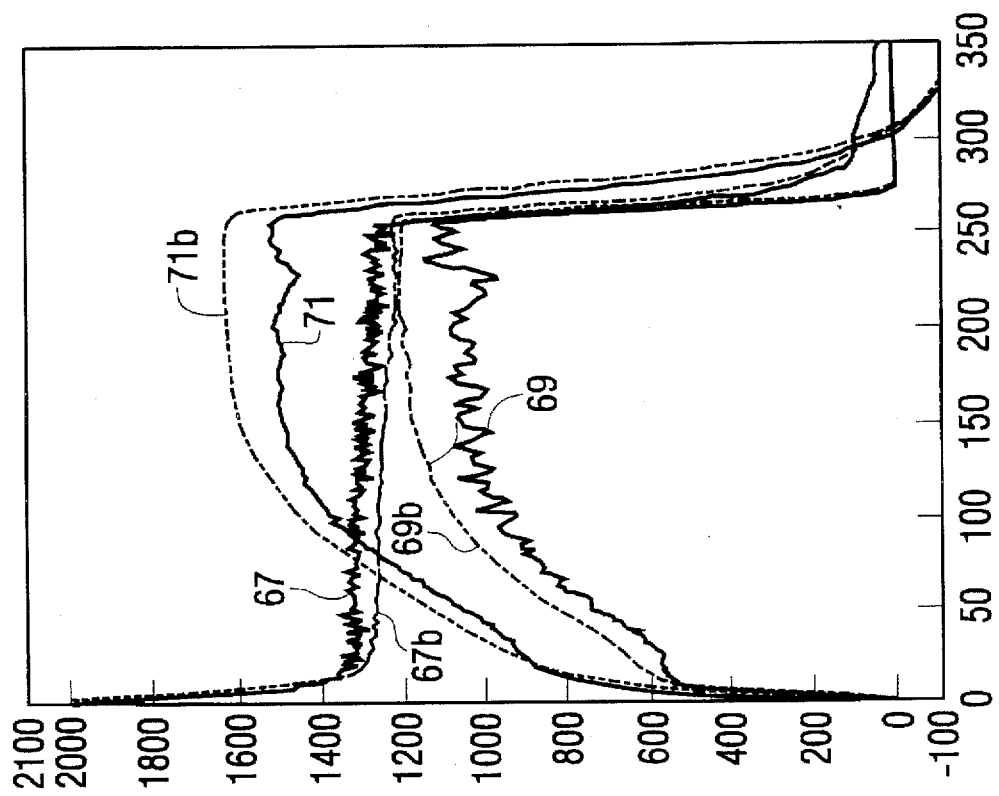
FIG. 4 is a display illustrating noticeable but acceptable deterioration of the weld head.
Figure 3:
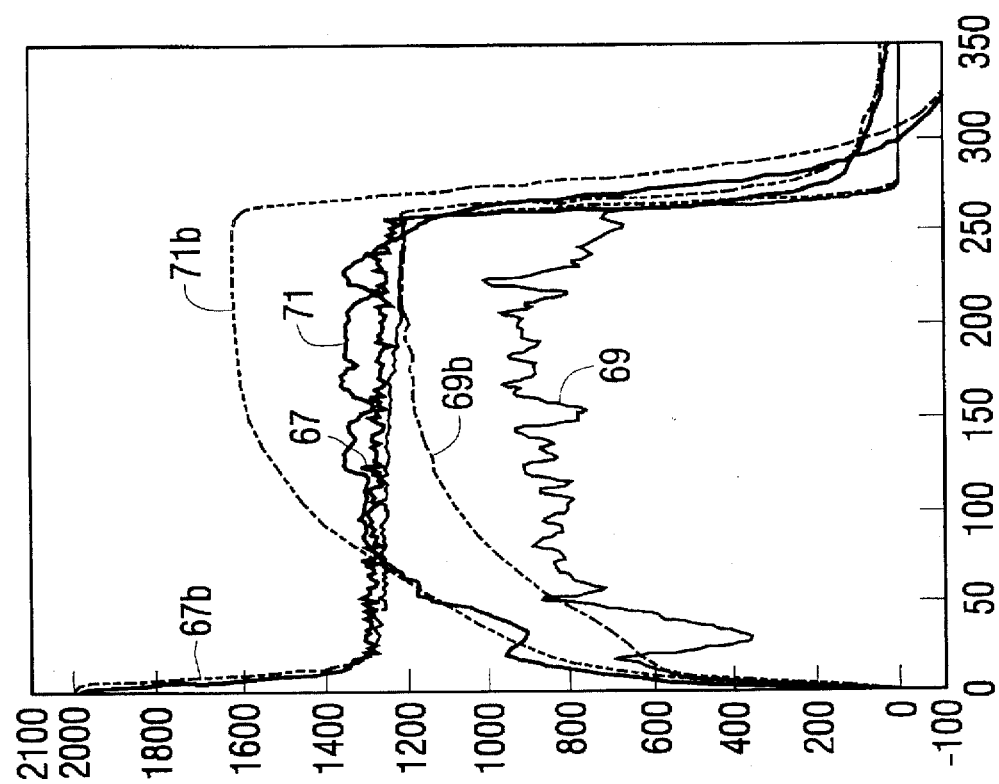
FIG. 3 is a display generated by the analyzer of the invention illustrating detection of a blow hole in a weld from examination of a single pulse.
Figure 5:
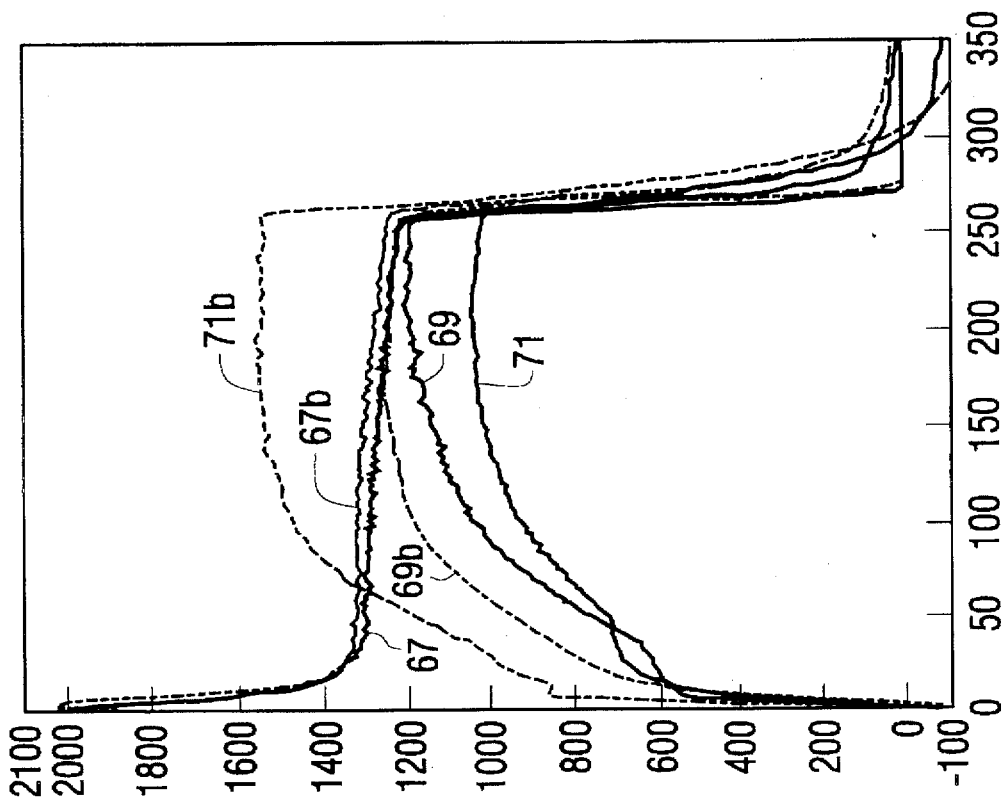
FIG. 5 is a display illustrating the average of all the pulses delivered during a low power preheat pass to a weld site.
Figure 6:
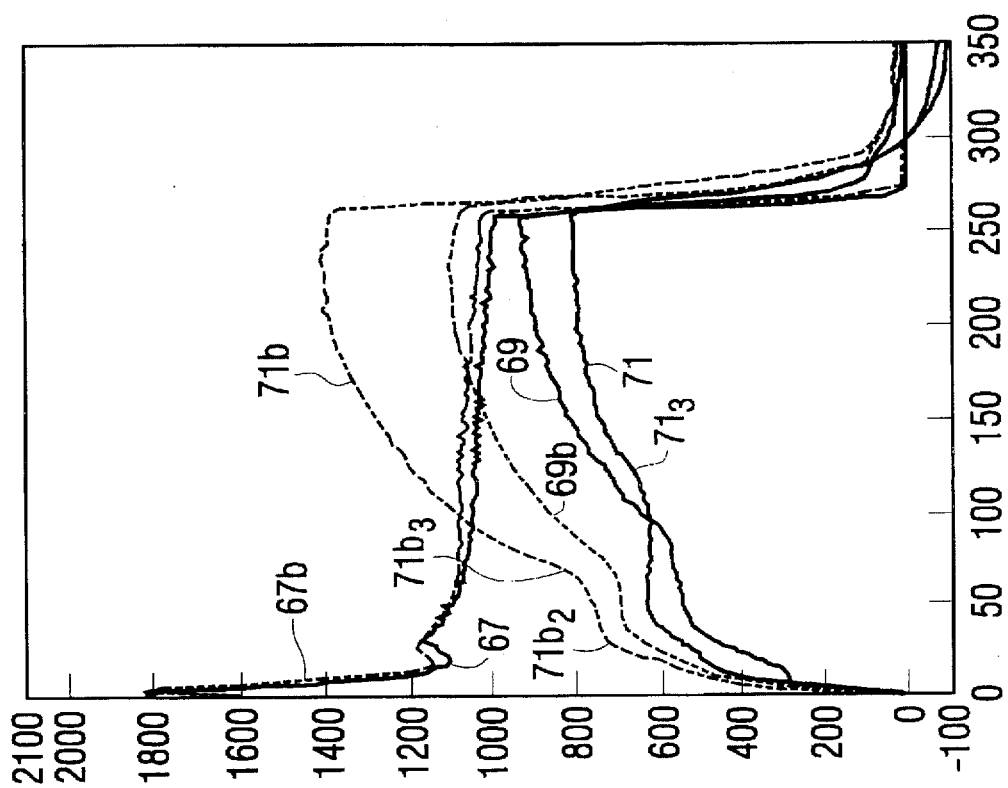
FIG. 6 is a display showing the average of all of the pulses delivered to the weld site during a high power weld pass.

FIG. 3 illustrates a display of the first type in which the amplitude of the pulse of the laser energy delivered to the weld site as measured by the energy monitor is represented by the trace 67. A base waveform for the delivered pulse is represented by the dotted line 67b. The response of the silicon detector 57a is represented by the trace 69. The base waveform for the silicon detector is represented by the trace 69b. Similarly, the response of the lead sulfide detector 57b to light from the weld site is shown by the trace 71 with the base waveform for this detector represented by the trace 71b. The abscissa of this graphical representation along with that of FIGS. 4–6 represents scans of the analyzer at 35 KHz and is therefore, a measure of time. The ordinate in these figures is an arbitrary measurement of amplitude. As can be seen by the traces 67 and 67b in FIG. 3, the power delivered to the weld site by the illustrated pulse is normal. However, it can be seen that the response of the silicon sensor 69 and the response 71 of the lead sulfide detector both initially follow the associated base waveforms 69b and 71b, respectively, but then level off and become erratic in amplitude. This is an indication of a poor weld, and particularly, a contaminant such as a blow hole. The erratic response of the detectors to the light from the weld site indicates a rough surface which would be the result of the splattering caused by the blow hole.

FIG. 4 illustrates a display generated for an individual pulse by a more normal weld condition. It can be seen here that the delivered pulse 67 is slightly higher in amplitude than the base waveform 67b. Each of the sensor responses 69 and 71 fairly well tracks the respective base waveforms 69b and 71b except that they do not quite reach the same amplitude. This can be an indication of a deterioration of the weld head, but the condition shown in FIG. 4 is within acceptable limits.

FIG. 5 illustrates a composite display for all of the pulses delivered during the 360° low power weld. Again, the power in the delivered pulses is normal as indicated by the close tracking of the base waveform 67b by the response 67 of the energy monitor. This display illustrates that the temperature of the weld sites increases substantially initially in response to the applied pulse of laser energy. This is represented by the initial substantial increase $71b_1$ in the base waveform for this detector. The base waveform the begins to level off at $71b_2$ as the applied energy goes into the latent heat of the metal. As additional energy is delivered to the weld site, the metal reaches the liquid state and a second substantial increase in the amplitude of the light received from the weld site takes place at $71b_3$.

In the example given in FIG. 5, it can be seen that the time of the second substantial increase $71_3$ in the lead sulfide detector response occurs an appreciable interval after the corresponding increase at $71b_3$ in the base waveform. This shows that the energy supplied to the weld site is below that for the base waveform. This can be due for instance to a deterioration in the weld head. The time interval from the application of the laser pulse until the metal reaches the liquid state at $71_3$ is called the heat-up rate in accordance with the invention and is a measure of the energy delivered to the weld site. FIG. 5 illustrates an abnormally long delay indicating a deterioration in the condition of the weld head.

FIG. 6 is a companion to FIG. 5 illustrating the average power delivered and light received from the weld site for the 360° high power weld made following the low power weld illustrated in FIG. 5. As can be seen here, the responses 69 and 71 of the detectors to light received from the weld site show that the power delivered was considerably below that of the base waveforms indicating a serious deterioration in the condition of the weld head. With such a response, the weld head can be replaced before deterioration reaches the stage where unsatisfactory welds are made. These displays of FIGS. 5 and 6 are of the second type in which average values for all of the pulses in the high power and low power welds are displayed.

FIGS. 7–12 illustrate displays of the third type. These figures all show values calculated for each of the pulses identified by angular position around the weld. In each case, laser energy is initially dumped into an energy dump (not shown) which is located between the connector 29' and the weld head 23. The values calculated for the low power weld begin at about −400° in these figures and the high power weld begins at about −20° so that there is some overlap to assure a complete weld.

Figure 7:
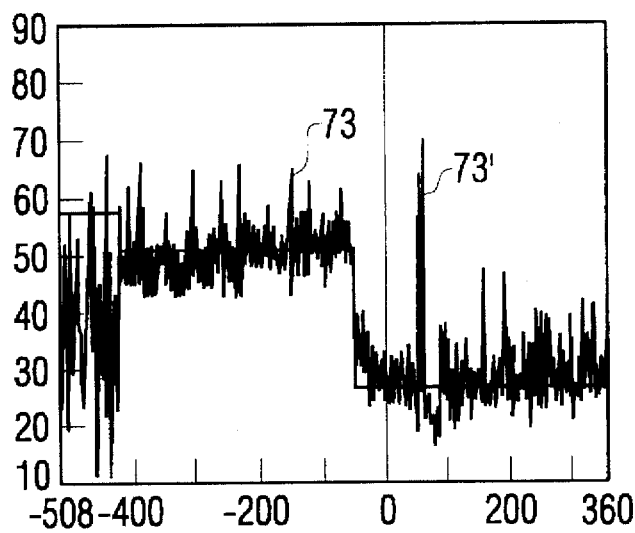
FIG. 7 is a composite of time of transition to the liquid state for each of the pulses delivered in a low power pass and the high power pass.

FIG. 7 illustrates the heat-up time for each of the pulses during a low energy weld on the left side of the figure and the high energy weld on the right side. As can be seen, the heat-up rate has a higher value for the low power weld as it takes longer to reach the liquid state at lower power. The spike 73' is illustrative of a blow hole where the splattering of the metal and resultant release of energy delays the time that it takes for the liquid state to be reached.

Figure 8:
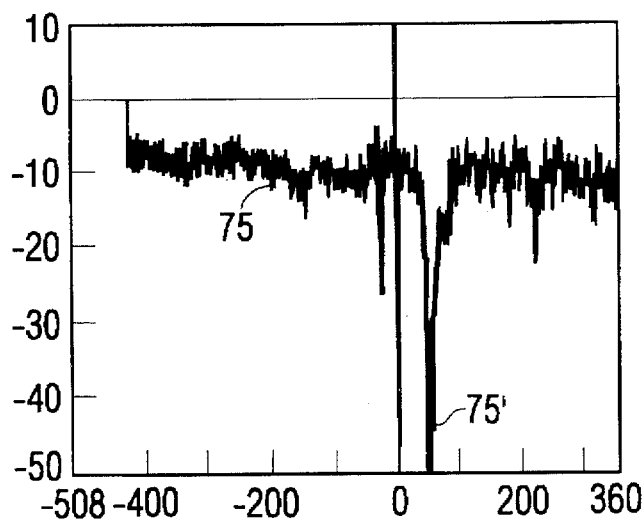
FIG. 8 is a display illustrating the composite change in the area under the instantaneous pulse curves for each of the pulses during the low power pass and the, high power pass.

FIG. 8 illustrates the change in area under each instantaneous pulse. In this display also the spike 75' indicates a blow hole.

Figure 9:
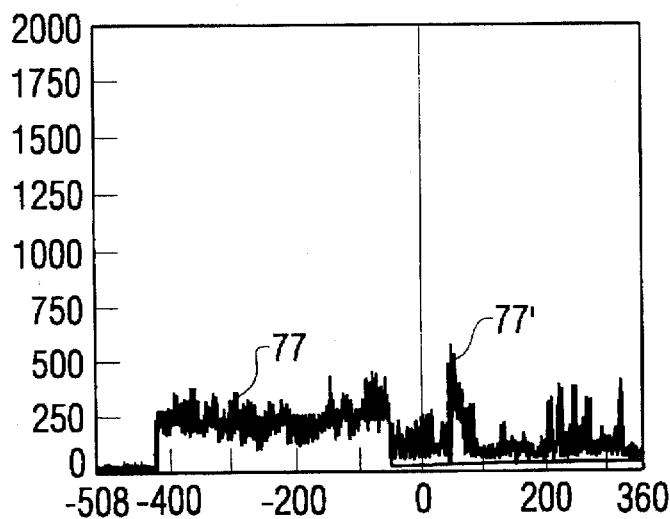
FIG. 9 is a composite display of the variance of the amplitude of the, light received from each of the pulses for both low power and high power welds.

The data acquisition system 45 also fits a third order polynomial function to the pulses. FIG. 9 illustrates the variance 77 of this third-order curve. This is a measure of the change in amplitude of the response pulses and is thus a measure of the roughness of the weld surface. Again, a blow hole produces a spike 77' in the variance.

Figure 10:
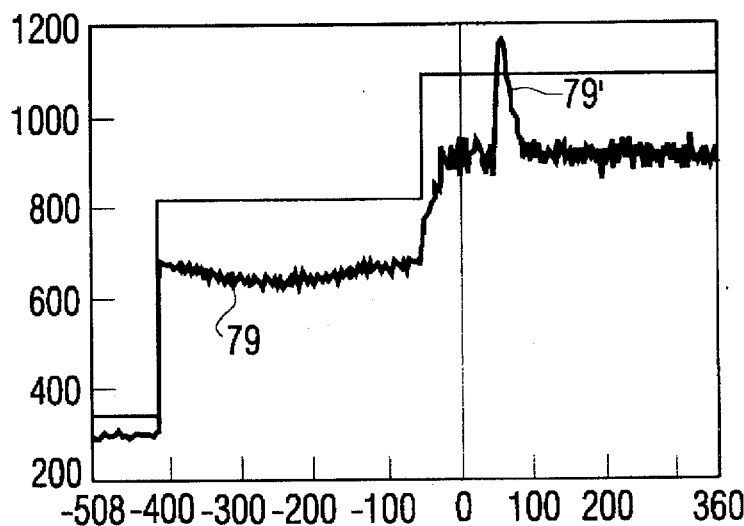
FIG. 10 is a composite display of the value of the first coefficient a third order curve fitting function for pulses delivered during the low power pass and the high power pass.
Figure 11:
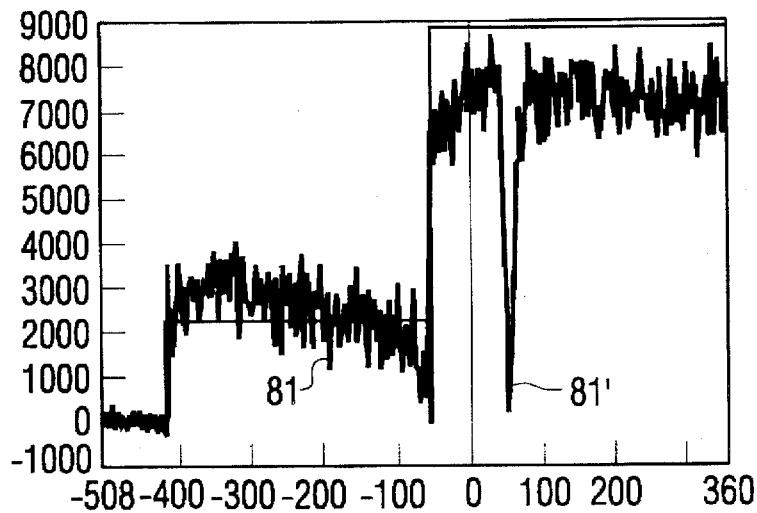
FIG. 11 is a composite display of the second coefficient of the third order curve fitting function.
Figure 12:
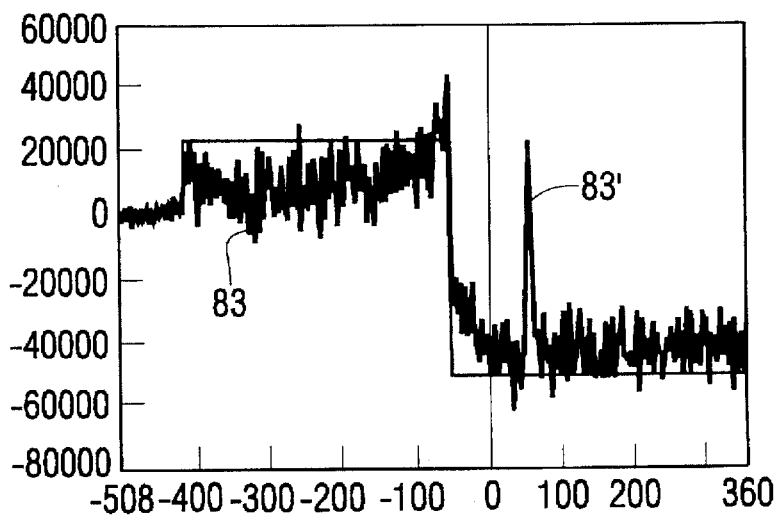
FIG. 12 is a composite display of the third coefficient of the third order curve fitting function.

FIGS. 10, 11 and 12 illustrate the first, second, and third coefficients 79, 81 and 83 respectively of this third order curve. As can be seen, the blow hole produces spikes 79', 81', and 83' in these functions also.

In general, it can be stated that a bad spot in a weld produces a discontinuity in one or more of the displayed parameters. A slow deterioration in the condition of the weld head can be detected from a steady reduction in the amplitude of the light from the weld site over many pulses or even several welds.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of making and simultaneously monitoring a laser weld at a weld site, said method comprising the steps of:

generating pulses of laser energy remote from said weld site;

delivering at least one of said pulses of laser energy to said weld site through optic fiber means; and analyzing light from said weld site during delivery of said at least one of said pulses of laser energy to said weld site by generating a display of both a wave shape of said light from said weld site during delivery of said at least one of said pulses of laser energy and a base wave shape, comparing said wave shape of said light from said weld site during delivery of said at least one of said pulses of laser energy to said base wave shape, with substantial deviations from said base wave shape being indicative of a weld defect and determining a heat-up rate of said weld site from said display of said wave shape of said light from said weld site during delivery of said pulses of laser energy to said weld site and comparing said heat-up rate to a heat up rate of said base wave shape.

2. The method of claim 1 wherein determining said heat-up rate comprises determining from said display of said wave shape of said light from said weld site a time interval after initiation of delivery of a pulse of laser energy to said weld site that said light from said weld site exhibits a second substantial upward shift in amplitude and comparing to a comparable time interval in said base wave shape.

3. The method of claim 2 wherein said step of delivering said at least one pulse of laser energy comprises delivering successive pulses to successive weld sites and said step of determining heat-up rate further comprises generating a display of heat-up rates for each of said successive weld sites.

4. The method of claim 1 wherein analyzing further comprises determining a relative peak temperature of said weld site from said light from said weld site during delivery of said pulses of laser energy to said weld site.

5. The method of claim 4 wherein determining said relative peak temperature comprises determining an area under pulses of said light from said weld site.

6. The method of claim 1 wherein said step of delivering said pulses of laser energy comprises connecting to said fiber optic means a weld head which directs said pulses of laser energy to successive weld sites and wherein said analyzing comprises determining from said display a deterioration in said weld head from a sustained reduction in amplitude of pulses of light from said weld sites over a plurality of pulses of laser energy delivered to said weld sites.

7. The method of claim 6 wherein said analyzing further includes monitoring from said display amplitude of said pulses of laser energy delivered to said weld sites to assure that there is no deterioration in power of the pulses delivered to the weld sites.

8. The method of claim 7 including changing-out said weld head when said step of determining deterioration in said weld head indicates a predetermined reduction in amplitude of pulses of light from said weld sites indicative of a minimal acceptable weld.

9. The method of claim 1 wherein a weld head provides the laser energy from the optic fiber means to the weld site, comprising the step of:

delivering additional pulses of laser energy to reweld when weld quality is poor before removing said weld head from said weld site.

10. The method of claim 9 adapted for use wherein a sleeve is placed inside a tube, and said pulses of laser energy are delivered to a weld site extending circumferentially around said sleeve so that said sleeve is welded to said tube, and wherein said additional pulses of laser energy are delivered to a second weld site axially displaced from said first weld site.

11. The method of claim 1 wherein said step of delivering said at least one pulse of laser energy comprises delivering successive pulses to successive weld sites and said step of comparing further comprises generating a display of an average of a plurality of wave shapes of light from said successive weld sites during delivery of a plurality of said successive pluses of laser light.

12. The method of claim 1 wherein said step of delivering said at least one pulse of laser energy comprises delivering successive pulses to successive weld sites and said step of analyzing comprises determining a parameter of said wave shape of light from said weld site for each weld site and generating a composite display of said parameter for said successive weld sites.

13. A method of simultaneously making and monitoring a weld at a weld site in a tube in a heat exchange of a nuclear power plant comprising the steps of:

generating pulses of laser energy, outside of said tube;

delivering said pulses of laser energy, to said weld site within said tube through optic fiber means; and analyzing light from said weld site during delivery of said pulses of laser energy to said weld site by comparing wave shape of said light from said weld site to base wave shapes and determining a heat-up rate of said weld site from said light from said weld site during delivery of said pulses of laser energy to said weld site by determining a time interval after initiation of delivery of a pulse of laser energy to said weld site that said light from said weld site exhibits a second substantial upward shift in amplitude.

14. The method of claim 13 wherein said step of analyzing comprises determining a relative peak amplitude of heat-up of said weld site from an area under a pulse of light from said weld site during delivery of a pulse of laser energy to said weld site.

15. The method of claim 13 wherein said step of analyzing comprises determining a deterioration in weld head delivery apparatus delivering said pulses of laser energy to said weld site from a sustained reduction in amplitude of light from said weld site over a plurality of pulses of laser energy, and monitoring amplitude of said pulses of laser energy delivered to said weld site to determine that said sustained reduction in amplitude of light from said weld site is not due to a reduction in power in said pulses of laser energy.

* * * * *